(12) United States Patent
Hirayama et al.

(10) Patent No.: US 6,563,619 B1
(45) Date of Patent: May 13, 2003

(54) INFRARED DATA COMMUNICATION APPARATUS AND METHOD

(75) Inventors: Michiko Hirayama, Kanagawa (JP); Takao Monden, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/400,522

(22) Filed: Sep. 20, 1999

(30) Foreign Application Priority Data

Oct. 8, 1998 (JP) ............................................. 10-286717

(51) Int. Cl.⁷ .............................................. H04B 10/00
(52) U.S. Cl. ........................................ 359/172; 359/163
(58) Field of Search ................................. 359/172, 152, 359/163; 345/76, 156

(56) References Cited

U.S. PATENT DOCUMENTS

| 5,701,189 A | * 12/1997 | Koda et al. .................. 359/172 |
| 6,262,824 B1 | * 7/2001 | Sasaki et al. ................ 359/163 |
| 6,271,953 B1 | * 8/2001 | Dishman et al. ............ 359/172 |

FOREIGN PATENT DOCUMENTS

| EP | 0 141 203 | 5/1985 |
| GB | 1 584 159 | 2/1981 |
| GB | 2 304 247 | 3/1997 |
| JP | 8-332953 | 12/1996 |
| JP | 08 332 954 A | 12/1996 |
| JP | 9-36805 | 2/1997 |
| JP | 10-56427 | 2/1998 |
| JP | 11-232017 | 8/1999 |
| JP | 2000-4238 | 1/2000 |
| JP | 2000-148317 | 5/2000 |

* cited by examiner

*Primary Examiner*—John Tweel
(74) *Attorney, Agent, or Firm*—Pearne & Gordon LLP

(57) ABSTRACT

An infrared data communication device which enables data transmission by infrared light, without provision of dedicated light projection/receiving windows and an infrared light emitting device or an infrared light detector on an outer packaging body of the device. An infrared light detector 19 is arranged on a circuit substrate 18 on an inside of a liquid crystal panel of a liquid crystal display 11, and then infrared data is received via the liquid crystal panel to convert electrically and send out to an infrared communicating portion. Also, a light emitting diode 15c, which informs a user of an incoming call by flashing, and an infrared light emitting device 15b are arranged on an inside of a photogenesis transparency component 15a of a lighting display portion 15, and the infrared data are emitted (transmitted) from the infrared light emitting device 15b via the photogenesis transparency component 15a.

11 Claims, 7 Drawing Sheets

INFRARED DATA COMMUNICATION APPARATUS AND METHOD

BACKGROUND OF THE INVENTION

The present invention relates generally to an infrared data communication apparatus for executing data transmission by transmitting and receiving infrared data and a method of implementing the same and, more particularly, to an infrared data communication apparatus for executing wireless data transmission by arranging an infrared light emitting device (hereinafter an "infrared ray emitting element") and an infrared light detector (hereinafter an "infrared ray receiving element") in a liquid crystal display, for example, provided to a miniaturized mobile telephone, a miniaturized mobile data terminal, or any electronic device and a method of implementing the same.

In the prior art, a well known example of an apparatus for executing infrared data transmission of this type is a television receiver and a remote controller for remote control operation of the television receiver. Another well known example of this type of device is one by which print data are transmitted from a general-purpose small computer (personal computer), etc. to a printer (e.g., Patent Application Publication (KOKAI) Hei 10-56427 entitle "Infrared Data Communication System"). Other well known examples of such prior art devices include those for executing data transmission between general-purpose small computers, and devices for executing data transmission via infrared light between a public telephone and a mobile terminal, for example, (e.g., Patent Application Publication (KOKAI) Hei 9-36805 entitled "Infrared Ray Communication System"). Since no cable connection is required in these examples, free spatial arrangement of the devices can be achieved.

Figure 7:
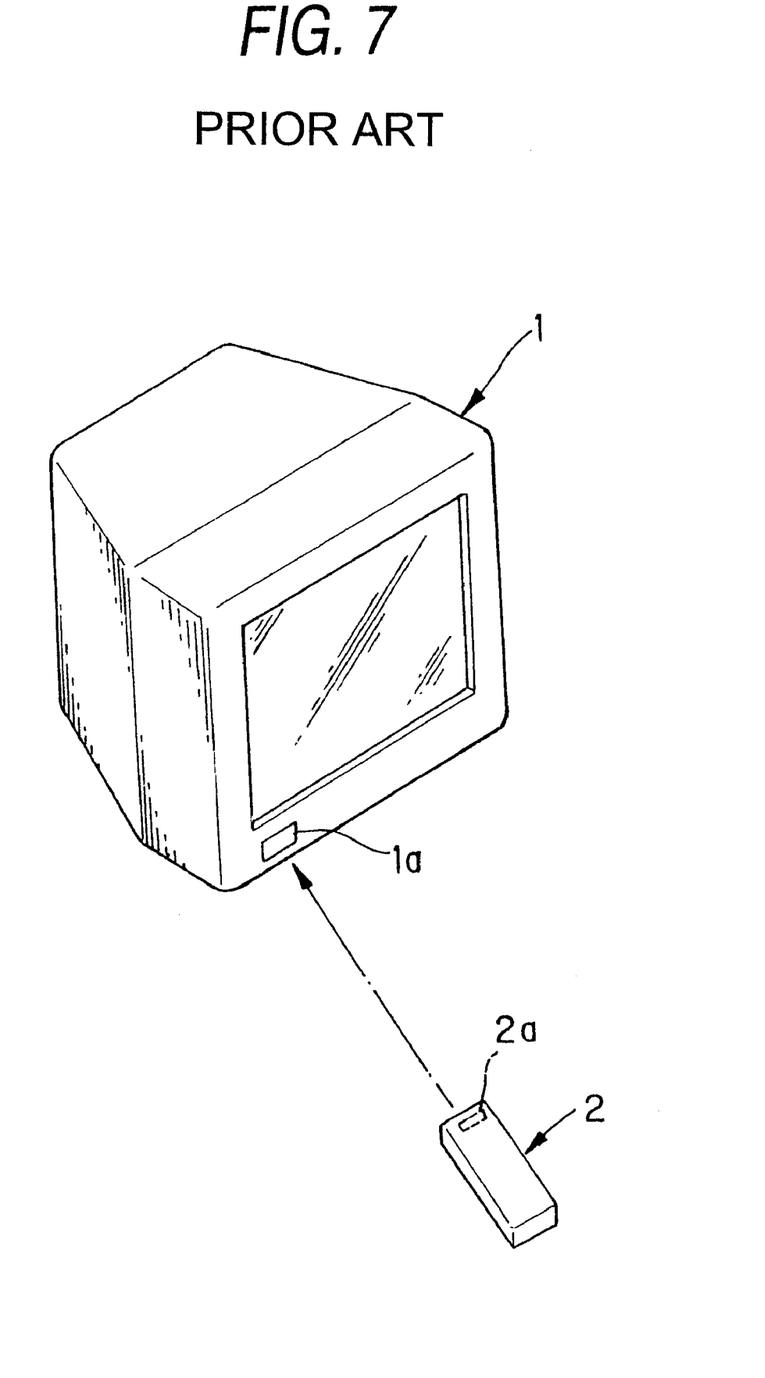
FIG. 7 is a perspective view showing how to use a television receiver and a remote controller for remote control operation in the prior art.

FIG. 7 is a perspective view showing how to use a television receiver and a remote controller for remote control operation in the prior art.

In this example, in a television receiver main body 1, a light receiving window 1a is provided onto a front surface (outer packaging body) of an infrared ray receiving element which receives an infrared command from a remote controller 2. The infrared command is transmitted (emitted) to the light receiving window 1a from an infrared ray emitting element of the remote controller 2 via a light projecting window 2a arranged on a front surface of the infrared ray emitting element to remotely control the channel tuning and the volume control.

Since relatively small information content is transmitted and received by the infrared command, a coding pulse train of several tens kHz is transmitted from the remote controller 2 to correspond to the remote operation, and then this coding pulse is decoded on the television receiver main body 1 to fetch the control signal and execute the channel tuning and the volume control.

Figure 8:
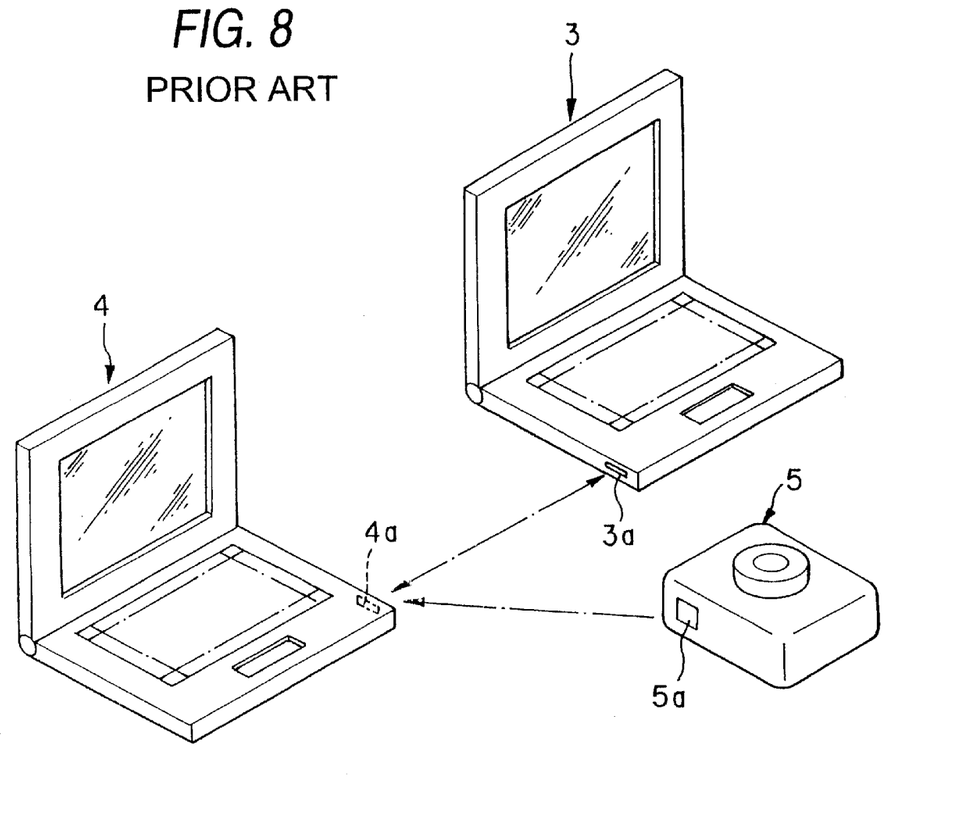
FIG. 8 is a perspective view showing data transmission between notebook- sized personal computers in the prior art.

FIG. 8 is a perspective view showing data transmission between notebook-sized personal computers in the prior art.

According to the transmission of data between notebook-sized personal computers in the prior art, a light projecting window 3a and a light receiving window 4a of two notebook-sized personal computers 3, 4 are positioned closely (e.g., 10 cm to 100 cm) and are arranged such that they oppose each other. Then, infrared data are transmitted and received via the infrared ray emitting element and the infrared ray receiving element installed in the light projecting window and the light receiving window 3a, 4a. Similarly, infrared data can be transmitted from a digital still camera (DSC) 5 or a mobile data terminal (not shown) whose light projecting window 5a is directed to oppose to the light projecting window 3a and the light receiving window 4a of two notebook-sized personal computers 3, 4.

Such infrared data transmission/reception between the personal computers can contain a large amount of data, the standard (IrDA/Ver 1.1, or the like) issued by the IrDA (Infrared Data Association) is applied the infrared data transmission/reception in most cases. For example, data transmission at the transmission rate of 4 Mbit/s is utilized.

In the prior art described as above, the light projecting window and the light receiving window must be provided on the front surfaces of the infrared ray emitting element and the infrared ray receiving element respectively. In this case, with the miniaturization of the device, arrangement locations of the light projecting window and the light receiving window cannot be easily obtained on the outer packaging body. For example, there is the problem that, if the infrared data transmission is carried out by the miniaturized mobile telephone (PDC/Personal Digital Cellular Telecommunication System, PHS/Personal Handyphone System), etc., arrangement locations for the light projecting window and the light receiving window cannot be easily provided on the outer packaging body. Also, there is the drawback that miniaturization of the device is spoiled if the dedicated light projecting window and the dedicated light receiving window are provided on the outer packaging body.

SUMMARY OF THE INVENTION

The present invention has been made to overcome such subjects in the prior art, and it is an object of the present invention to provide an infrared data communication apparatus capable of executing infrared data transmission and reception by arranging an infrared ray emitting element and an infrared ray receiving element in a liquid crystal display, etc. of a miniaturized electronic device such as a mobile device, etc., without provision of dedicated light projecting window/ light receiving window and infrared ray emitting element/infrared ray receiving element on an outer packaging body to emit/receive the infrared data, and also accelerating miniaturization of the device by simplifying an outer appearance configuration, and a method of implementing the same.

In order to achieve the above object, according to an infrared data communication apparatus of the first aspect of the present invention, there is provided an infrared data communication apparatus for communicating transmission infrared data, said infrared data communication apparatus comprising an infrared ray receiving element which is arranged on an inside of a liquid crystal panel of a liquid crystal display provided to the electronic device, the infrared ray receiving element receiving the infrared data from an external device via the liquid crystal panel, then converting the infrared data into electrical data, and then sending out said electric data to a communication control portion.

Also, the infrared data communication apparatus comprises further an infrared ray emitting element which is arranged on the inside of the liquid crystal panel, the infrared ray emitting element emitting transmission data, supplied from the communication control portion, as infrared data via the liquid crystal panel to transmit the transmission data to the external device.

Also, according to the infrared data communication apparatus of the present invention, there is provided the infrared data communication apparatus for communicating transmission infrared data, comprising an infrared ray emitting element which is arranged on an inside of a liquid crystal panel of a liquid crystal display provided to the electronic device or on an inside of an emitted light transmitting portion for producing a visual display, the infrared ray emitting element emitting transmission data, supplied from the infrared communication portion, as infrared data via the liquid crystal panel or the emitted light transmitting portion to transmit the transmission data to the external device.

Also, according to the infrared data communication apparatus, there is provided the infrared data communication apparatus for communicating transmission infrared data, comprising an infrared ray receiving element arranged on an inside of a liquid crystal panel of a liquid crystal display provided to the electronic device for receiving the infrared data supplied from an external device via the liquid crystal panel, then converting the infrared data into electrical data, and then sending out the electric data to a communication control portion; a photogenesis transparency component (hereinafter an "emitted light transmitting member") whose one end side is positioned on a surface of an outer body, for transmitting a light generated by a light emitting diode for providing a lighting display; and an infrared ray emitting element arranged on an inside of the emitted light transmitting member, wherein said infrared ray emitting element emits transmission data from the infrared communicating portion as infrared data via the emitted light transmitting member to an external device.

Also, according to the infrared data communication apparatus, there is provided the infrared data communication apparatus which further comprises a current supplying means for supplying a driving current to the infrared ray emitting element such that the infrared ray receiving element can receive the infrared data radiated by the infrared ray emitting element through a predetermined region, which is set as a light receiving region, of the liquid crystal panel in a receiver side electronic device.

Also, according to the infrared data communication apparatus, there is provided the infrared data communication apparatus further comprising a display controlling means for screen-displaying a receiving frame indicating a range, through which the infrared ray receiving element can receive the infrared data, on the liquid crystal panel of the liquid crystal display in transmitting the infrared data.

According to an infrared data communication method of the present invention, there is provided an infrared data communication method of communicating transmission data as infrared data between electronic devices each having a liquid crystal display, comprising the steps of arranging an infrared ray receiving element on an inside of a liquid crystal panel of the liquid crystal display; receiving infrared data supplied from an external device by the infrared ray receiving element via the liquid crystal panel; and converting the infrared data electrically to form transmission data.

Also, according to the infrared data communication method, there is provided the infrared data communication method further comprising the step of arranging an infrared ray emitting element on the inside of the liquid crystal panel; and transmitting transmission data as the infrared data from the infrared ray emitting element to an external device via the liquid crystal panel.

Also, according to the infrared data communication method, there is provided the infrared data communication method of communicating transmission data as infrared data between electronic devices, comprising the steps of arranging an infrared ray emitting element on an inside of a liquid crystal panel of a liquid crystal display provided to the electronic device or an inside of an emitted light transmitting portion for providing a lighting display; and transmitting transmission data from the infrared ray emitting element to an external device as the infrared data via the liquid crystal panel or the emitted light transmitting portion.

Also, according to the infrared data communication method, there is provided the infrared data communication method of communicating transmission data as infrared data between electronic devices each having a liquid crystal display and a light emitting diode, comprising the steps of arranging an infrared ray receiving element on an inside of a liquid crystal panel of the liquid crystal display; receiving the infrared data supplied from an external device by the infrared ray receiving element via the liquid crystal panel, and converting the infrared data electrically to from transmission data; arranging an infrared ray emitting element on an inside of an emitted light transmitting member which transmits an emitted light from a light emitting diode to a lighting display; and emitting transmission data from the infrared ray emitting element as the infrared data, and transmitting the transmission data to the external device via the emitted light transmitting member.

In the infrared data communication apparatus and method of the present invention, since the infrared ray receiving element is arranged on the inside of the liquid crystal panel in the liquid crystal display and then the infrared data can be received via the liquid crystal panel, the infrared data can be transmitted and received without provision of the dedicated light receiving window and the infrared ray receiving element per se, which are employed to receive the infrared data, on the outer packaging body of the small-sized electronic device such as the mobile device, e.g., the mobile telephone, the mobile data terminal, etc. Therefore, the outer appearance configuration of the electronic device having an infrared data communication function can be simplified, and obstacle factors in reducing the size can be reduced, and also the miniaturization of the electronic device can be further facilitated.

In the infrared data communication apparatus and method of the present invention, since the infrared ray emitting element is arranged on the inside of the liquid crystal panel in the liquid crystal display or on the inside of the emitted light transmitting portion for providing the lighting display and then the infrared data are transmitted from the infrared ray emitting element via the liquid crystal panel or the emitted light transmitting portion, the infrared data can be transmitted and received without provision of the dedicated light projecting window and the infrared ray emitting element per se on the outer packaging body of the small-sized electronic device such as the mobile device, the mobile data terminal, etc., and thus the outer appearance configuration can be simplified and also the miniaturization of the device can be facilitated.

Moreover, in the infrared data communication apparatus and method of the present invention, since the infrared data are transmitted and received mutually by arranging the infrared ray receiving element on the inside of the liquid crystal panel of the liquid crystal display and arranging both the light emitting diode, which informs of the call incoming by flashing, for example, and the infrared ray emitting element, which radiates the infrared data, on the inside of the emitted light transmitting portion, the infrared data can be transmitted and received without provision of the dedicated light projection/receiving windows and the infrared ray emitting/receiving elements themselves on the outer packaging body of the miniaturized electronic device, and thus the outer appearance configuration can be simplified and also the miniaturization of the device can be further more facilitated. In this case, since the infrared ray receiving element and the infrared ray emitting element can be relatively separated in arrangement, interference of the infrared data can be reduced in multi-way (two-way) communication such as simultaneous transmission/reception, and thus transmission errors can be reduced.

Furthermore, in the infrared data communication apparatus and method of the present invention, since the driving current is supplied to the infrared ray emitting element such that the infrared ray receiving element can receive the infrared data being radiated by the infrared ray emitting element through the overall region of the liquid crystal panel, positioning of the device can be simplified in transmitting the infrared data and also a positioning operation to receive the infrared data precisely can be made easy. In addition, since the receiving frame is screen-displayed on the liquid crystal panel of the liquid crystal display to indicate the range through which the infrared ray receiving element can receive the infrared data, the user can check easily arrangement of the device at the time of infrared data communication.

DETAILED DESCRIPTION OF THE PREFERRED EMBODIMENTS

An infrared data communication apparatus and a method of implementing the same according to embodiments of the present invention will be explained in detail with reference to the accompanying drawings hereinafter.

Figure 1A:
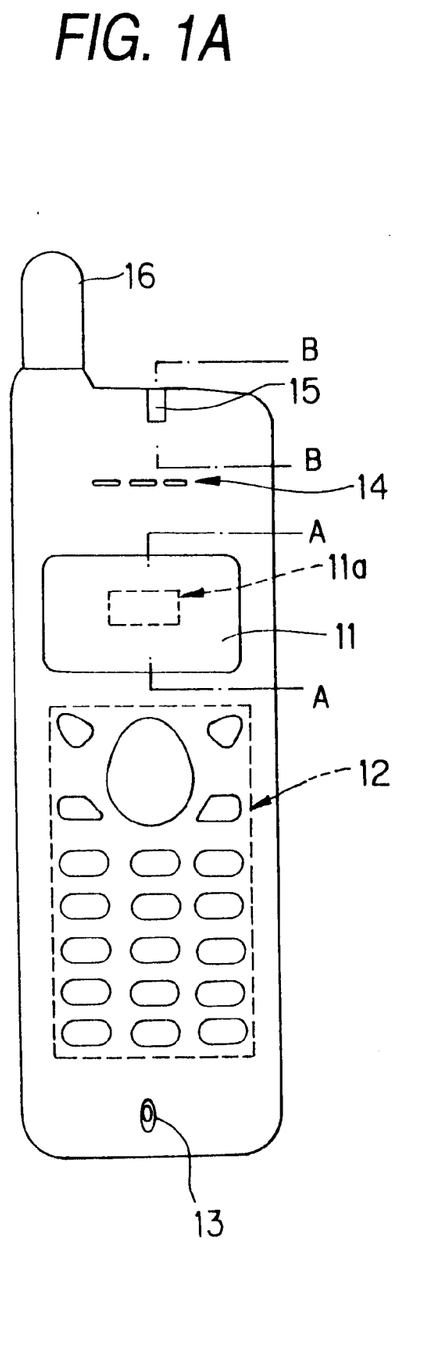
FIGS. 1A and 1B are a front view and a partially cut-away sectional view showing an outer appearance configuration of a mobile telephone according to a first embodiment of the present invention, to which an infrared data communication apparatus and method are applied, respectively.
Figure 1B:
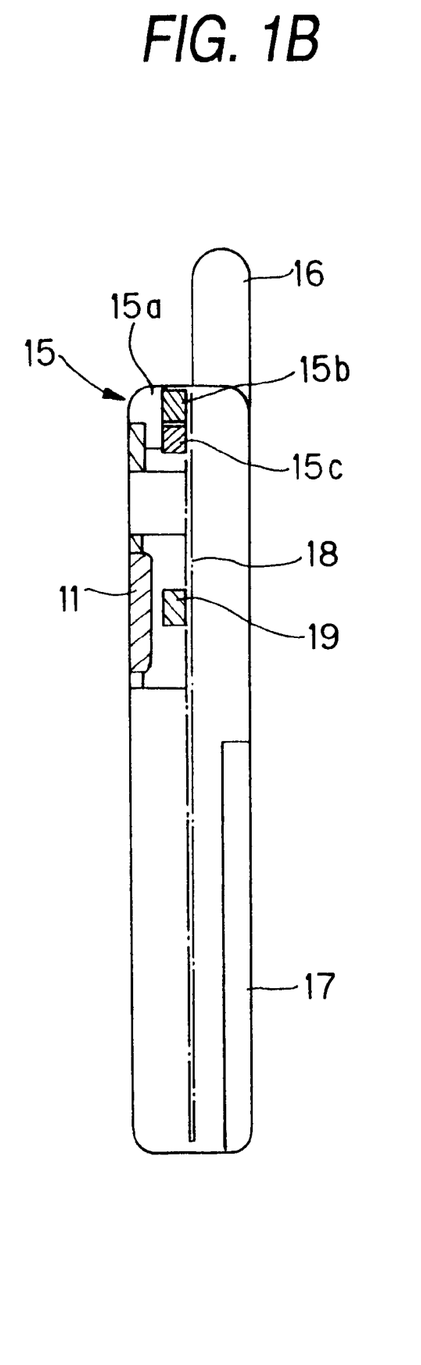

FIG. 1 is a front view and a partially cut-away sectional view showing an outer appearance configuration of a mobile telephone according to a first embodiment of the present invention, to which an infrared data communication apparatus and a method of implementing the same are applied, respectively. In the first embodiment, there is shown an example in which the mobile telephone serving as a small size mobile device is utilized as an electronic device into which the infrared data communication apparatus is installed.

This mobile telephone (PDC/PHS) comprises, on a front portion of an outer packaging member shown in FIG. 1A, a liquid crystal display (LCD) 11 for displaying various process data (e.g., an antenna symbol bar indicating a received electric field strength of a radio line from a cell base station whose location is registered, a sender telephone number provided by a telephone network at the time of an incoming call, an input telephone number, etc.), an input operating portion 12 which includes various functions, e.g., an on/off hook button, a ten key keypad for inputting the input telephone number, etc., a microphone 13 for transmitting the speech of a first user, a speaker 14 for receiving the speech of a second user, a lighting display portion 15 that is illuminated by a light emitting diode 15c to visually indicate an incoming call, etc., and an antenna 16 for transmitting/receiving information to/from the cell base station via an electric signal. Also, as shown in FIG. 1B, a rechargeable battery 17 is installed on a back surface of the outer packaging body.

Also, in the liquid crystal display 11 (in a partially cut-away portion along a sectional line A—A), an infrared ray receiving element 19 is provided in the inside of a liquid crystal panel of the liquid crystal display 11, as shown in FIG. 1B, e.g., between a center back surface of the liquid crystal panel and a circuit substrate 18 or on the circuit substrate 18. If a back light is provided to the liquid crystal display 11 on which the infrared ray receiving element 19 is arranged, the back light element is mounted on the circuit substrate 18 beside the infrared ray receiving element 19, for example. According to this configuration, it is possible to receive the infrared ray without trouble when the back light is turned on. In this case, the infrared ray receiving element 19 may be provided on the back surface of the end portion of the liquid crystal panel, etc.

In an infrared data transmission mode, as shown in FIG. 1A, a receiving frame (or an area displayed fully in black) 11a, through which the infrared ray receiving element 19 can receive the infrared data, is screen-displayed as an index in a center portion of the liquid crystal panel of the liquid crystal display 11. The user transmits the infrared data from another device to direct to this receiving frame 11a. In this case, the receiving frame 11a may not be displayed, and thus display of the liquid crystal display 11 may be set optionally.

The lighting display portion 15 (in a partially cut-away portion along a sectional line B—B), as shown in FIG. 1B, is comprised of an emitted light transmitting member 15a, an infrared ray emitting element 15b for emitting the infrared data, and a light emitting diode (LED) 15c that illuminates to provide the user with visual indicia of an incoming call, etc. The emitted light transmitting member 15a transmits the infrared data, in the form of infrared light, or the light emitted by the light emitting diode 15c to the lighting display portion which is disposed on an outer surface of the electric device. A lateral sectional shape of the emitted light transmitting member 15a may be designed freely like "L-shape", "Y-shape", "triangular shape", etc. according to the arrangement situation.

Figure 2:
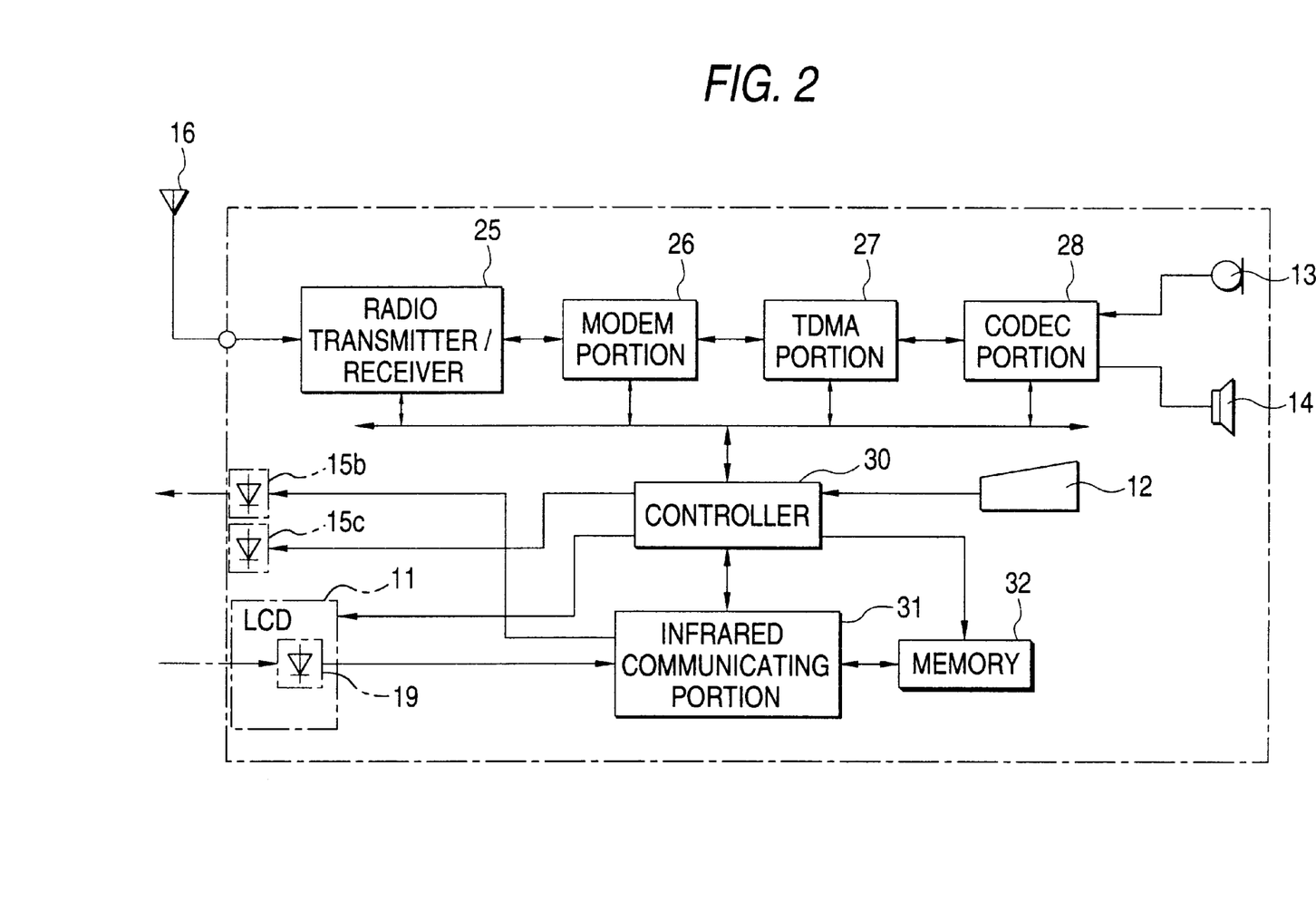
FIG. 2 is a block diagram showing an electric configuration of the mobile telephone in FIG. 1.

FIG. 2 is a block diagram showing an electric configuration of the mobile telephone in FIG. 1.

In this configurational example, in addition to the liquid crystal display 11, the input operating portion 12, the microphone 13, the speaker 14, the infrared ray emitting element 15b, the light emitting diode 15c, the antenna 16, and the infrared ray receiving element 19, all being shown in FIG. 1, a signal processor portion formed by an electronic circuit being constructed on the circuit substrate 18 is provided.

The signal processor portion comprises a radio transmitter/receiver 25 which includes a synthesizer to decide a frequency, a received electric field strength detecting (RSSI) circuit, etc. to execute radio transmission/reception via frequency conversion; a MODEM portion 26 for modulating a transmitted signal and demodulating a received signal by virtue of PSK, for example; a TDMA portion 27 for carrying out time division multiple access (TDMA) to decide a time slot, etc.; a CODEC portion 28 for coding the transmitted speech signal and decoding the received speech signal; a controller 30 for executing control of radiotelephony, particularly for controlling the infrared data communication in the embodiment of the present invention; an infrared communicating portion 31 for executing control protocol as for the infrared data transmission from the infrared ray emitting element 15b and the infrared data reception by the infrared ray receiving element 19; and a memory 32 for storing the transmitted data and the received data. The infrared communicating portion 31 has a driving circuit as a current supplying means for supplying the current to the infrared ray emitting element 15b, but its illustration is emitted.

Figure 3:
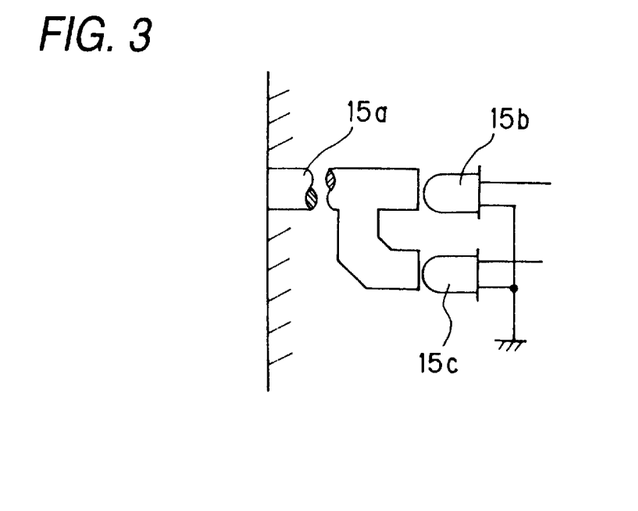
FIG. 3 is a side view showing an example of a configuration of a lighting display portion.

FIG. 3 is a side view showing a configurational example of the lighting display portion 15.

The lighting display portion 15 includes the emitted light transmitting member 15a (here in the shape of a circular cylinder or quadrangular prism whose lateral sectional shape is almost Y-shape) which is exposed to the surface of the outer packaging of the body of the electric device, and emits a flashing light to inform a user of an incoming call, or, alternatively radiates (transmits) the infrared data when the electric device is in transmission mode. The infrared ray emitting element 15b is arranged in the vicinity of one end portion of the emitted light transmitting member 15a. The light emitting diode (LED) 15c is arranged in the vicinity of the other end portion of the emitted light transmitting member 15a. The infrared data is radiated (transmitted) by the infrared ray emitting element 15b to the outside via the emitted light transmitting member 15a. An incoming call, for example, is indicated by illumination of the light emitting diode 15c, said emitted light from the light emitting diode is transmitted to the outside of the electric device via the emitted light transmitting member 15a. In this case, regardless of its configuration, the lighting display portion 15 may be as part of a structure which uses the light emitting diode to indicate the on-state of the power supply. In such an arrangement, a lamp, or other light emitting device may be used in place of the light emitting diode if it can transmit at least visible rays.

Next, usage and operations of the first embodiment will be explained hereunder.

In the configuration in FIG. 2, operations as the mobile telephone, i.e., line connection to the telephone network by the calling, speech to the calling person by sending out the number signal (telephone number), and line disconnection by the on-hook signal are normal operations, and their explanation will be omitted. In addition, in these operations, hand over processes caused by slave synchronization, location registration, and move, slot decision by scanning the received electric field strength by using TDMA, modulation/demodulation, coding/decoding, etc. are also normal operations, and their explanation will be omitted.

At the time of an incoming call, the controller 30 receives the incoming call signal from the cell base station of the telephone network via the antenna 16 and the radio transmitter/receiver 25. The controller 30 transmits the received call signal to the light emitting diode 15c. The illumination of the light emitting diode 15c is radiated to the outside through the emitted light transmitting member 15a to inform the user of the incoming call.

Next, infrared data transmission will be explained hereunder.

As the infrared data to be transmitted, there are a variety of data of the mobile telephone. Here, for example, the case where telephone directory data (telephone number, name, etc.) stored in the controller 30 are transferred as transmission data will be explained.

When the user inputs a special number by using the input operating portion 12 shown in FIGS. 1 and 2, the controller 30 is set into the infrared data transmission mode (transmission mode). Further, the transmission data being transmitted in the infrared data transmission mode are designated. At this time, the controller 30 has a function as a display controlling means, and the infrared data transmission mode, the transmission data, the receiving frame 11a, or the like is screen-displayed on the liquid crystal panel of the liquid crystal display 11.

The controller 30 transmits the transmission data to the memory 32. Then, the controller 30 starts the infrared communicating portion 31 to read the communication program, and renders the infrared communicating portion 31 to execute its control protocol. According to this execution, the modulation is applied to the transmission data which are temporarily stored in the memory 32, and the modulated data are sent out to the infrared ray emitting element 15b as the driving signal. The infrared ray emitting element 15b emits the light in answer to the transmission data, and radiates (transmits) the light as the infrared data to the device (not shown) serving as a communication object via the emitted light transmitting member 15a.

In contrast, the infrared data indicating reception acknowledge (ACK) issued by the reception checking sequence are irradiated into the liquid crystal display 11 from the device (not shown) serving as the target of the wireless data communication. Similarly, in the receiving mode of the infrared data transmission mode, the infrared data which are associated with the transmission data supplied from the device serving as the source of the wireless communication are irradiated onto the liquid crystal display 11. The infrared data are transmitted through the liquid crystal panel of the liquid crystal display 11 and then irradiated onto the infrared ray receiving element 19 for receipt thereby. Then, an infrared conversion signal as an output of the infrared ray receiving element 19 is input into the infrared communicating portion 31, where the demodulation of the transmission data is executed and stored in the memory 32 as working process. The controller 30 receives the received and stored transmission data and then displays the data on the screen of the liquid crystal display 11, for example. In this manner the transmission data such as the telephone directory data are transmitted as infrared data by executing the communication sequence. That is, wireless data transmission can be achieved.

In this case, the communication protocol to be used may be determined by consideration of the amount of data to be transmitted. If a user desires to transmit a large amount of transmission data, standard (IrDA/Ver 1.1), for example, issued by the IrDA may be selected. If a small amount of transmission data is to be transmitted, or if the device is employed in close proximity to the target device, the original simplified communication protocol may be employed since the communication protocol having the versatility of the aforementioned IrDA/Ver 1.1 is not needed.

Figure 4:
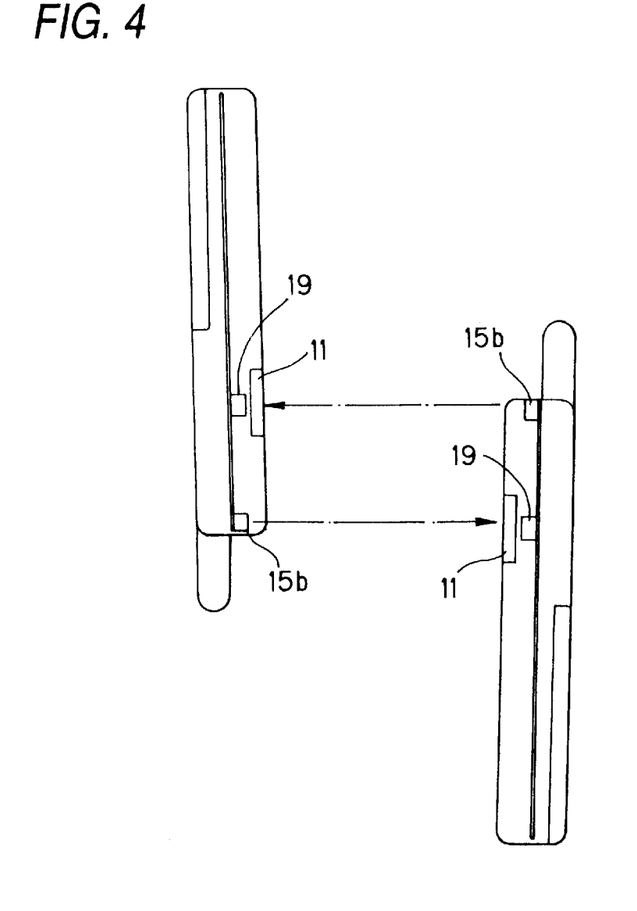
FIG. 4 is a side view showing how to use the mobile telephone in the first embodiment.

FIG. 4 is a side view showing how to use the mobile telephone in the first embodiment.

In this example, two mobile telephones, each having the configuration shown in FIG. 1, are arranged to oppose each other in the opposite direction. In other words, the infrared data are transmitted and received by arranging the infrared ray emitting element 15 and the infrared ray receiving element 19 of the first mobile telephone on one side and the infrared ray receiving element 19 and the infrared ray emitting element 15b of the second mobile telephone on the other side to oppose each other. In this case, the infrared ray emitting elements 15b of the mobile telephones on both sides are not positioned close but separated from each other. As a result, generation of transmission error by multi-way (two-way) communication can be reduced without interference with the infrared data (cross-modulation) in simultaneous transmission/reception.

In this manner, as in the first embodiment, the infrared ray receiving element 19 arranged on the inside of the liquid crystal display 11 makes it possible to receive the infrared data. In other words, it is not necessary for the light receiving window for the infrared ray receiving element 19 and the infrared ray receiving element 19 itself to be provided on the outer packaging of the body of the electronic device. As a result, the configuration of the outer packaging body of the electronic device which can perform the infrared data communication can be simplified. Also, space efficiency in the outer appearance of the electronic device's configuration can be improved, so that the miniaturization of the device can be facilitated.

Irradiation of the infrared data by the infrared ray emitting element 15b and irradiation of the emitted light by the light emitting diode 15c can be achieved commonly by the single lighting display portion 15, and thus transmission of the infrared data and light flashing by the light emitting diode can be achieved via the single emitted light transmitting member 15a. In other words, it is not necessary to provide the dedicated light projecting window for the infrared ray emitting element 15b on the outer packaging of the electronic device's body, and thus the configuration of the outer packaging can be simplified. Moreover, since a distance between the infrared ray emitting element 15b and the infrared ray receiving element 19 is set wide in this configuration, interference between transmitted/received infrared data will be minimized.

Next, a second embodiment will be explained hereunder.

Figure 5A:
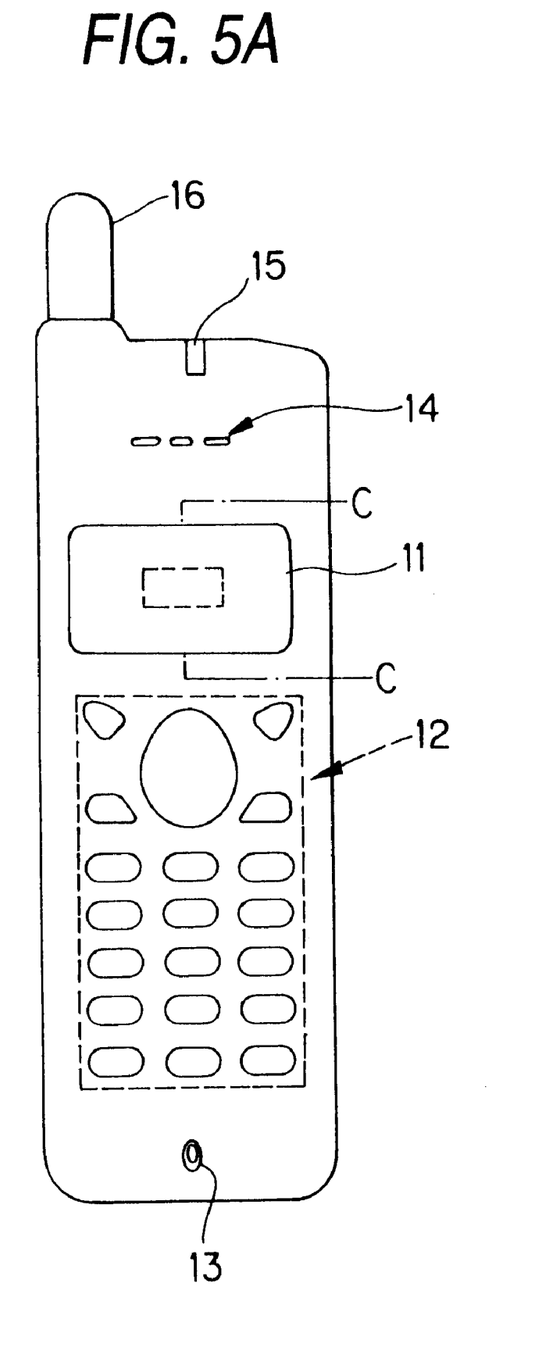
FIGS. 5A and 5B are a front view and a partially cut-away sectional view showing an outer appearance configuration of a mobile telephone according to a second embodiment of the present invention respectively.
Figure 5B:
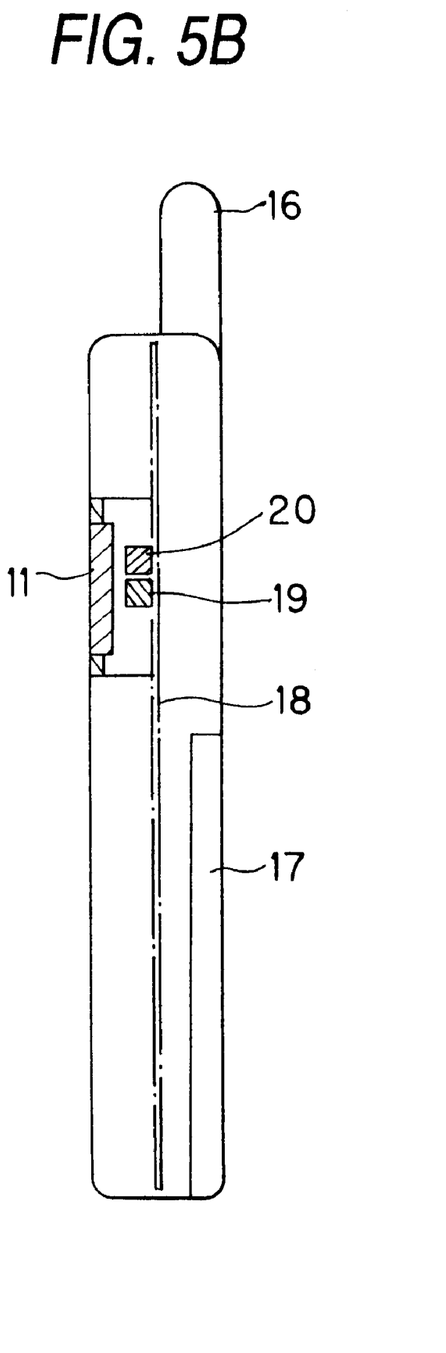
Figure 6:
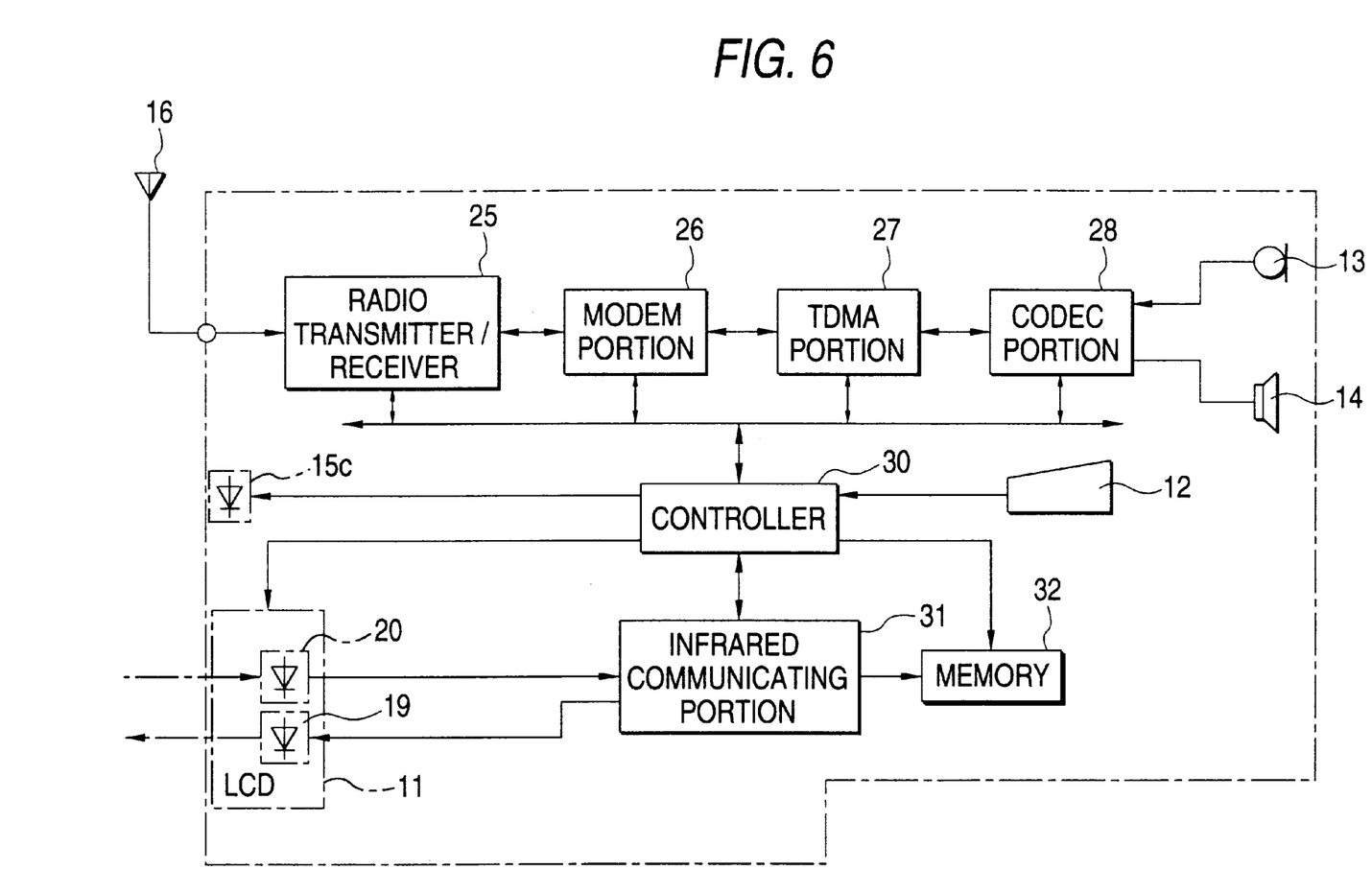
FIG. 6 is a block diagram showing an electric configuration of the mobile telephone in FIG. 5.

FIG. 5 is a front view and a partially cut-away sectional view showing an outer appearance configuration of a mobile telephone according to a second embodiment of the present invention, to which the infrared data communication apparatus and method are applied, respectively. FIG. 6 is a block diagram showing an electric configuration of the mobile telephone in FIG. 5.

In the second embodiment, as shown in the cut-away portion along a sectional line C—C, both the infrared ray receiving element 19 and the infrared ray emitting element 20 are provided on the inside of the liquid crystal panel of the liquid crystal display 11, for example, between the center back surface of the liquid crystal panel and the circuit substrate 18. Here, the lighting display portion 15 is comprised of only the light emitting diode (LED) 15c, which is used to inform the user of an incoming call, for example, by illuminating the lighting display portion 15, instead of both the light emitting diode 15c and the infrared ray emitting element 15b as illustrated in FIG. 4. Other configurations also encompassed by the present invention are similar to those shown in FIGS. 5A and 5B. Also, the electric configuration of the mobile telephone according to the second embodiment of the present invention shown in FIG. 6 and its operation, other than the infrared ray emitting element 20, is similar to that in the first embodiment.

The configuration of the second embodiment can achieve the further miniaturization of the electronic device as well as the advantages of the first embodiment. Advantageously, it is easy to apply this configuration to an electronic device that does not include the lighting display portion 15 for executing the informing operation of the light emitting diode 15c.

In the examples shown in FIGS. 5 and 6, the infrared ray receiving element 19 and the infrared ray emitting element 20 are provided closely on the inside of the liquid crystal panel of the liquid crystal display 11. However, the infrared ray receiving element 19 and the infrared ray emitting element 20 may be arranged on the inside of the liquid crystal panel to be separated to its maximum, e.g., at the uppermost portion and the lowermost portion, or the diagonal corner portions. In this case, interference of the infrared data can be reduced in simultaneous transmission/reception.

Next, a third embodiment will be explained hereunder.

In the third embodiment, all areas of the liquid crystal panel of the liquid crystal display 11 are set as a light receiving region which is available for the reception of the infrared data. In the above first and second embodiments, the light receiving region (receiving frame 11a) is set at a predetermined region (a center region in FIGS. 1 and 5) of the liquid crystal panel of the liquid crystal display 11. In this case, since the receiving frame 11a is a relatively narrow region, a transmission setting operation of the infrared data (precisely directing operation of the device) may be rendered difficult. This drawback can be improved by the third embodiment.

For that purpose, the light receiving region on the infrared ray receiving element 19 side is extended by increasing an amount of light emission of the infrared ray emitting element 15b in FIGS. 1 and 2 or the infrared ray emitting element 20 in FIGS. 5 and 6. In this case, the infrared communicating portion 31 renders the driving current being supplied from the driving circuit to increase. For example, the supply current can be increased by providing a voltage follower circuit, or varying the value of a current limiting resistor to increase the amount of light emission. Other operations in the infrared data communication are similar to those in the first and second embodiments.

According to this configuration, in the light receiving device, the infrared data can be received by any region on the liquid crystal display 11. Thus, the need for a dedicated receiving frame 11a acting as the index in the infrared data transmission mode can be eliminated. As a result, the transmission setting operation can be simplified and also operability of the device can be improved.

In the above first to third embodiments, explanation has been made by applying the infrared data communication apparatus to the mobile telephone, but the infrared data communication apparatus may be applied to other electronic devices. For example, like the first embodiment, as in the radio paging device, the infrared ray receiving element is provided on the inside of the liquid crystal display, and the light emitting diode and the infrared ray emitting element are provided together on the inside of the emitted light transmitting portion such as a power supply for the lighting display portion, for example, and also the infrared ray communication portion is provided in the device. Otherwise, like the second embodiment, the infrared ray emitting element and the infrared ray receiving element are arranged on the inside of the liquid crystal display and the infrared communication portion is also provided in the device. In this case, information such as the weather forecast, for example, which are received by the broadcast communication, can be transferred to other devices as the infrared data.

As in the radio paging device, the present invention can be applied to any electronic device with the liquid crystal display such as the mobile data terminal and the notebook-sized personal computer, for example. In the simple outer packaging body structure in which the dedicated light transmitting portion for the infrared data communication exists, various transmission data such as text data, numeric data, image data, remote control data, etc. can be transmitted as the infrared data.

As evident from the above explanation, according to the infrared data communication apparatus and method of the present invention, the infrared ray receiving element is arranged on the inside of the liquid crystal panel in the liquid crystal display and then the infrared data can be received by the infrared ray receiving element via the liquid crystal panel. Therefore, the infrared data can be transmitted and received without provision of a dedicated light receiving window and infrared ray receiving element on the outer packaging body of a small-sized electronic device. Thus, the outer appearance and configuration of the electronic device can be simplified and also the miniaturization of the device can be facilitated.

In addition, according to the infrared data communication apparatus and method of the present invention, the infrared ray emitting element is arranged on the inside of the liquid crystal panel in the liquid crystal display or at the inner end of the emitted light transmitting member of the lighting display portion and then the infrared data are transmitted from the infrared ray emitting element via the liquid crystal panel or the emitted light transmitting member. Therefore, the infrared data can be transmitted and received without provision of a dedicated light projecting window and infrared ray emitting element on the outer packaging body of the small-sized electronic device. Thus, the outer appearance and configuration of the electronic device can be simplified, and the miniaturization of the device can be facilitated.

Moreover, since the infrared data are transmitted and received mutually by arranging the infrared ray receiving element on the inside of the liquid crystal panel of the liquid crystal display and arranging the infrared ray emitting element on the inside of the emitted light transmitting member of the lighting display portion, the infrared ray receiving element and the infrared ray emitting element can be relatively separated in arrangement. Therefore, interference with the infrared data can be reduced in multi-way communication and accordingly, transmission errors can also be reduced.

What is claimed is:

1. An infrared data communication apparatus for communicating transmission infrared data, comprising:
   a liquid crystal display having a liquid crystal panel;
   a communication control portion which controls data communication;
   an infrared light detector which is arranged on an inside of said liquid crystal panel, said infrared light detector receiving the infrared data from an external device via said liquid crystal panel, then converting said infrared data into electric data, and then sending out said electric data to said communication control portion.

2. An infrared data communication apparatus according to claim 1, further comprising an infrared light emitting device which is arranged on the inside of the liquid crystal panel, the infrared light emitting device emitting transmission data, supplied from the communication control portion, as infrared data via the liquid crystal panel to transmit the transmission infrared data to the external device.

3. An infrared data communication apparatus for communicating transmission infrared data to an external device, said infrared data communication apparatus comprising:
   a liquid crystal display having a liquid crystal panel;
   an emitted light transmitting portion for lighting indication;
   a communication control portion which controls data communication; and
   an infrared light emitting device which is arranged on one of an inside of said liquid crystal panel of said liquid crystal display and an inside of said emitted light transmitting portion, the infrared ray emitting element emitting transmission data, supplied from the communication control portion, as infrared data via said liquid crystal panel and said emitted light transmitting portion to transmit the transmission infrared data to the external device.

4. An infrared data communication apparatus for communicating transmission infrared data, comprising:
   a liquid crystal display having a liquid crystal panel;
   a communication control portion which controls data communication;
   an infrared light detector arranged on an inside of said liquid crystal panel of the liquid crystal display, for receiving the infrared data supplied from an external device via the liquid crystal panel, then converting the infrared data into electric data, and then sending out the electric data to said communication control portion;
   a photogenesis transparency component whose one end side is positioned on a surface of an outer packaging body, for transmitting a light generated by a light emitting diode for illuminating a lighting display; and
   an infrared light emitting device arranged on an inside of said photogenesis transparency component, for emitting transmission data from the communication control portion as infrared data via the photogenesis transparency component to transmit the infrared data to an outside of said outer packaging body.

5. An infrared data communication apparatus according to any one of claims 2, 3, and 4, further comprising a current supplying means for supplying a driving current to the infrared ray emitting element such that the infrared ray emitting element emits the infrared data to be received by the infrared ray receiving element of a receiver side electronic device through a predetermined region, which is set as a light receiving region, of the liquid crystal panel in the receiver side electronic device.

6. An infrared data communication apparatus according to any one of claims 1, 2, and 4, further comprising a display controlling means for screen-displaying a receiving frame indicating a range, through which the infrared light detector can receive the infrared data, on the liquid crystal panel of the liquid crystal display in transmitting the infrared data.

7. An infrared data communication method of communicating transmission infrared data between electronic devices each having a liquid crystal display having a liquid crystal panel, comprising the steps of:
   arranging an infrared light detector on an inside of said liquid crystal panel of said liquid crystal display;
   receiving infrared data supplied from an external device by the infrared light detector via the liquid crystal panel; and converting the infrared data into electrical data to form transmission data.

8. An infrared data communication method according to claim 7, further comprising the step of:

arranging an infrared light emitting device on the inside of the liquid crystal panel; and transmitting transmission data as the infrared data from the infrared light emitting device to an external device via the liquid crystal panel.

9. An infrared data communicating method of communicating transmission infrared data between electronic devices, comprising the steps of:

arranging an infrared light emitting device on an inside of a liquid crystal panel of a liquid crystal display provided to the electronic device or an inside of an emitted light transmitting portion for illuminating a lighting display; and transmitting transmission data from the infrared light emitting device to an external device as the infrared data via the liquid crystal panel or the emitted light transmitting portion.

10. An infrared data communication method of communicating transmission infrared data between electronic devices each having a liquid crystal display and a light emitting diode for illuminating a lighting display, comprising the steps of:

arranging an infrared light detector on an inside of a liquid crystal panel of the liquid crystal display;

receiving the infrared data supplied from an external device by the infrared light detector via the liquid crystal panel, and converting the infrared data electrically to form transmission data;

arranging an infrared light emitting device on an inside of an photogenesis transparency component which transmits an emitted light from a light emitting diode for illuminating a lighting display; and emitting transmission data from the infrared light emitting device as the infrared data, and transmitting the transmission data to the external device via the photogenesis transparency component.

11. A portable cellular phone comprising an infrared data communication apparatus as claimed in any one of claims 1 to 4.

* * * * *